(12) United States Patent
Raj et al.

(10) Patent No.: US 12,407,562 B1
(45) Date of Patent: Sep. 2, 2025

(54) ARTIFICIAL INTELLIGENCE POWERED DISTRIBUTED SERVER NETWORK

(71) Applicant: BANK OF AMERICA CORPORATION, Charlotte, NC (US)

(72) Inventors: Antony Robert Raj, Tamilnadu (IN); Selvaraj Muthurakkianan, Tamil Nadu (IN); Raghavendra Veerupakshappa, Telangana (IN); Ravi Ranjan Shandilya, Telangana (IN); Iruvanti John Dinakar, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 9 days.

(21) Appl. No.: 18/591,215

(22) Filed: Feb. 29, 2024

(51) Int. Cl.
| | | |
|---|---|---|
| *H04L 41/0663* | (2022.01) | |
| *H04L 41/16* | (2022.01) | |
| *H04L 43/04* | (2022.01) | |

(52) U.S. Cl.
CPC .......... *H04L 41/0663* (2013.01); *H04L 41/16* (2013.01); *H04L 43/04* (2013.01)

(58) Field of Classification Search
CPC ....... H04L 9/3236; H04L 9/3247; H04L 9/50; H04L 43/0852; H04L 63/00; H04L 41/16; G06Q 40/04; G06Q 2220/00
See application file for complete search history.

(56) References Cited

U.S. PATENT DOCUMENTS

| | | | |
|---|---|---|---|
| 10,721,274 B1 * | 7/2020 | Prasad | ................ H04L 41/0893 |
| 10,884,636 B1 | 1/2021 | Abrol | |
| 10,917,471 B1 | 2/2021 | Karumbunathan | |
| 10,924,548 B1 | 2/2021 | Karumbunathan | |
| 10,970,395 B1 | 4/2021 | Bansal | |
| 11,010,233 B1 | 5/2021 | Golden | |
| 11,042,452 B1 | 6/2021 | McNutt | |
| 11,048,590 B1 | 6/2021 | Sapuntzakis | |
| 11,133,076 B2 | 9/2021 | Karr | |
| 11,171,950 B1 | 11/2021 | Zhuravlev | |
| 11,210,009 B1 | 12/2021 | Freilich | |
| 11,288,138 B1 | 3/2022 | Freilich | |
| 11,354,058 B2 | 6/2022 | Bernat | |
| 11,360,689 B1 | 6/2022 | Grunwald | |
| 11,729,251 B2 | 8/2023 | Ankam | |
| 11,762,781 B2 | 9/2023 | Irwin | |
| 11,797,569 B2 | 10/2023 | Grunwald | |
| 11,803,338 B2 | 10/2023 | Gold | |
| 11,929,839 B1 * | 3/2024 | Regan | ...................... G06N 3/09 |

(Continued)

*Primary Examiner* — Chirag R Patel (74) *Attorney, Agent, or Firm* — Moore & Van Allen PLLC; Nicholas C. Russell (57) ABSTRACT

A system is provided for process monitoring using a quantum artificial intelligence powered distributed server network. In particular, the system may continuously monitor processes being executed within the network environment. Upon detecting an issue with the process, the system may use a quantum AI oracle to identify the root cause of the issue. Once the root cause has been identified, the system may adjust a process reliability score associated with the faulty computing device or application. By generating process reliability scores for the various computing devices and applications within the network environment, the architecture of the network environment may be modified by selectively including components that function reliably.

20 Claims, 7 Drawing Sheets

(56) References Cited

U.S. PATENT DOCUMENTS

| | | |
|---|---|---|
| 11,995,336 B2 | 5/2024 | Margaglia |
| 2020/0320422 A1* | 10/2020 | Lubensky .............. G06N 10/60 |
| 2021/0216630 A1 | 7/2021 | Karr |
| 2022/0247678 A1 | 8/2022 | Atwal |
| 2023/0236552 A1 | 7/2023 | Cella |
| 2023/0412626 A1* | 12/2023 | Wright ................... H04L 41/16 |
| 2024/0039734 A1* | 2/2024 | De Santis ............. H04L 9/3236 |
| 2024/0146062 A1 | 5/2024 | Cella |

\* cited by examiner

ARTIFICIAL INTELLIGENCE POWERED DISTRIBUTED SERVER NETWORK

TECHNOLOGICAL FIELD

Example embodiments of the present disclosure relate to a system and method for process monitoring using a quantum artificial intelligence powered distributed server network.

BACKGROUND

There is a need for a way to perform intelligent and automated monitoring of process performance.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for process monitoring using a quantum artificial intelligence ("AI") powered distributed server network. In particular, the system may continuously monitor processes being executed within the network environment (e.g., by reading data logs associated with such processes). Upon detecting an issue with the process (e.g., processing delays, breaks in functionality, process downtime or unavailability, and/or the like), the system may use a quantum AI oracle to identify the root cause of the issue (e.g., a faulty computing device or application within the process workflow). Once the root cause has been identified, the system may adjust a process reliability score associated with the faulty computing device or application. By generating process reliability scores for the various computing devices and applications within the network environment, the architecture of the network environment may be modified by selectively including components that function reliably.

Accordingly, embodiments of the present disclosure provide a system for process monitoring using a quantum artificial intelligence powered distributed server network, the system comprising a processing device; a non-transitory storage device containing instructions when executed by the processing device, causes the processing device to perform the steps of monitoring a process within a network environment by reading one or more data logs associated with the process; detecting an issue associated with the process within the network environment; using a quantum artificial intelligence ("AI") based oracle, identifying one or more causes associated with the issue, wherein the one or more causes include at least one of a faulty computing device or application; executing a smart contract to adjust a process stability score associated with the faulty computing device or application; and appending a data record to the distributed register, wherein the data record comprises the process stability score associated with the faulty computing device or application.

In some embodiments, adjusting the process stability score comprises based on a timeframe specified in the smart contract, detecting a delay in a resolution of the issue; and based on detecting the delay, decreasing the process stability score.

In some embodiments, adjusting the process stability score comprises detecting a resolution of the issue within a timeframe specified in the smart contract; and increasing the process stability score.

In some embodiments, adjusting the process stability score further comprises detecting that the process stability score has dropped below a designated threshold; removing the faulty computing device or application from a workflow of the process; and including a replacement computing device or application in the workflow of the process in place of the faulty computing device or application.

In some embodiments, adjusting the process stability score further comprises detecting that the process stability score is above a designated threshold; and maintaining the faulty computing device or application within a workflow of the process.

In some embodiments, the issue comprises at least one of a performance issue, stability issue, or functionality issue.

In some embodiments, the faulty computing device or application is a third party computing device or application.

Embodiments of the present disclosure also provide a computer program product for process monitoring using a quantum artificial intelligence powered distributed server network, the computer program product comprising a non-transitory computer-readable medium comprising code causing an apparatus to perform the steps of monitoring a process within a network environment by reading one or more data logs associated with the process; detecting an issue associated with the process within the network environment; using a quantum artificial intelligence ("AI") based oracle, identifying one or more causes associated with the issue, wherein the one or more causes include at least one of a faulty computing device or application; executing a smart contract to adjust a process stability score associated with the faulty computing device or application; and appending a data record to the distributed register, wherein the data record comprises the process stability score associated with the faulty computing device or application.

In some embodiments, adjusting the process stability score comprises based on a timeframe specified in the smart contract, detecting a delay in a resolution of the issue; and based on detecting the delay, decreasing the process stability score.

In some embodiments, adjusting the process stability score comprises detecting a resolution of the issue within a timeframe specified in the smart contract; and increasing the process stability score.

In some embodiments, adjusting the process stability score further comprises detecting that the process stability score has dropped below a designated threshold; removing the faulty computing device or application from a workflow of the process; and including a replacement computing device or application in the workflow of the process in place of the faulty computing device or application.

In some embodiments, adjusting the process stability score further comprises detecting that the process stability score is above a designated threshold; and maintaining the faulty computing device or application within a workflow of the process.

In some embodiments, the issue comprises at least one of a performance issue, stability issue, or functionality issue.

Embodiments of the present disclosure also provide a computer-implemented method for process monitoring using a quantum artificial intelligence powered distributed server network, the computer-implemented method comprising monitoring a process within a network environment by reading one or more data logs associated with the process; detecting an issue associated with the process within the network environment; using a quantum artificial intelligence ("AI") based oracle, identifying one or more causes associated with the issue, wherein the one or more causes include at least one of a faulty computing device or application; executing a smart contract to adjust a process stability score associated with the faulty computing device or application; and appending a data record to the distributed register, wherein the data record comprises the process stability score associated with the faulty computing device or application.

In some embodiments, adjusting the process stability score comprises based on a timeframe specified in the smart contract, detecting a delay in a resolution of the issue; and based on detecting the delay, decreasing the process stability score.

In some embodiments, adjusting the process stability score comprises detecting a resolution of the issue within a timeframe specified in the smart contract; and increasing the process stability score.

In some embodiments, adjusting the process stability score further comprises detecting that the process stability score has dropped below a designated threshold; removing the faulty computing device or application from a workflow of the process; and including a replacement computing device or application in the workflow of the process in place of the faulty computing device or application.

In some embodiments, adjusting the process stability score further comprises detecting that the process stability score is above a designated threshold; and maintaining the faulty computing device or application within a workflow of the process.

In some embodiments, the issue comprises at least one of a performance issue, stability issue, or functionality issue.

In some embodiments, the faulty computing device or application is a third party computing device or application.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, investment vehicles, cryptographic and/or digital currencies, and/or the like. In yet other embodiments, the resources may include real-world goods or commodities that may be acquired and/or exchanged by a user.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

Processes that are executed within a networked environment may be dependent on multiple different components (e.g., client computing devices, applications, backend servers, databases, application programming interfaces, and/or the like). Furthermore, certain components within the workflow of the process may include components that may be owned and/or operated by third party entities. In the event that an issue arises with respect to execution of the process, it may not always be clear which component is the root cause of the issue. In turn, this makes it difficult to identify which components have been problematic in the past, which hinders an entity's ability to select the most reliable components to drive its processes. Accordingly, there is a need for an intelligent, efficient way to track the performance of the various components over time.

To address the above concerns among others, the system described herein provides a way to intelligently monitor and track performance of various components associated with an executed process within the network environment (e.g., an end-to-end process). In particular, the system may continuously generate data logs associated with each running process, where the logs may be generated at one or more computing devices that are within the workflow of the process. For instance, the process may be a process or workflow within nodes, devices, and/or applications within a distributed ledger technology ("DLT") network. The logs may contain information such as an identification of the process and/or its dependencies, a current stage or step of the process and/or an outline of the total steps in the process, current status of the process, performance metrics (e.g., processing times, component uptime, and/or the like), and/or the like.

In some cases, in cases in which a portion of the components that execute the process belong to third parties, the entity may establish an agreement with such third parties regarding expected performance standards of the third party components. In this regard, the agreement may be implemented into a distributed register hosted by the entity in the form of a smart contract. Accordingly, in the event that a third party component fails to meet performance standards, the system may automatically enforce the agreements through execution of the smart contract.

The system may comprise a quantum AI-based oracle that may connect the smart contract to external data, systems, and/or processes. In this regard, the oracle may connect the smart contract to external data feeds regarding the various components involved in the overarching process (e.g., computing systems, applications, and/or the like). In this way, if a DLT process is dependent on an external or third party component, and such component experiences issues (e.g., the component is unavailable, is experiencing performance issues such as network or processing latency, has hindered functionality or unintended side effects from bugs, and/or the like), the oracle may be aware of such issues and automatically execute one or more remediation steps to address the issues.

In some embodiments, the system may maintain a database of third parties along with the associated third party components that are in turn associated with the processes that may be executed or running within the network environment (e.g., a DLT related process). In this regard, the database may comprise historical data of regarding past issues encountered by the system with the various third party components. For instance, the historical data may comprise information such as the type of issue encountered, the priority level of the issue (e.g., the level of impact that a failure of the component had on the process to be executed), whether the issue was remedied or whether any remediation steps were missed, the amount of time taken to remedy the issue, and/or the like. Based on the historical data, the system may compute a reliability score associated with the third party and/or the third party components. In this regard, the system may compute a reliability score associated with the third party, where the reliability score is a composite score comprising a weighted average of the reliability scores associated with each of the third party components associated with the third party.

In some embodiments, the quantum AI oracle may comprise a predictor module, where the predictor module may receive inputs such as the detected issues, a priority level associated with the issues, and/or the smart contract. Based on such inputs, the predictor module may predict the action or remediation step to be taken when the detected issue is remedied by the third party in accordance with the performance standards or, alternatively, if the detected issue remains at least partially unresolved. For instance, the performance standards may require that certain issues (e.g., server downtime, network latency, resource uptime, and/or the like) are resolved within a specified timeframe. Accordingly, in some embodiments, detecting that an issue has not been resolved according to the performance standards may include detecting that the issue has not been resolved within the specified timeframe.

Based on detecting that an issue with a third party component has not been resolved according to the performance standards as defined in the smart contract, the predictor module may generate a recommendation to reduce the reliability score associated with the third party component and/or the third party associated with the third party component. The degree to which the reliability score is reduced may be dependent on factors such as the complexity and/or priority level of the issue, the amount of time elapsed past the acceptable timeframe as defined in the smart contract, the remediation steps attempted by the third party, and/or the like. On the other hand, upon detecting that the issue with the third party component has been resolved according to the performance standards, the predictor module may generate a recommendation to increase the reliability score associated with the third party component and/or the third party associated with the third party component. The amount by which the reliability score is increased may be determined by factors including the priority level of the issue (the fewer high priority issues are experienced, the higher the reliability score), the frequency at which issues are encountered, the response time for remediation steps, and/or the like.

In some embodiments, the quantum AI oracle may comprise an updater module that may receive the recommendations generated by the predictor module and subsequently update the reliability score according to the recommendations (e.g., adjusting the reliability scores of the third party and/or third party component). Once the reliability score has been adjusted, the updater module may store a record of the adjustment to the database of third parties (e.g., as historical data associated with the third party and/or the associated third party components). In turn, this may allow the predictor module to generate additional recommendations regarding the third party and/or third party components. For instance, the historical data may indicate that issues with a certain third party's components have historically been resolved promptly and in accordance with the smart contract. In such a scenario, the predictor module may generate a recommendation to maintain the third party components in the workflow of the process being evaluated. On the other hand, the historical data may indicate that issues with another third party's components have on several occasions been resolved after a delay (e.g., a timeframe longer than what is specified in the smart contract), or in some instances have yet to be resolved. In such a scenario, the predictor module may generate a recommendation to remove the third party components from the workflow of the process. In some embodiments, generating the recommendation may comprise identifying a replacement third party component based on historical data associated with the replacement third party component. In such a scenario, the updater module may be configured to change the workflow of the process to exclude the removed third party component and include the replacement third party component. In this way, the system may provide an efficient in-line enforcement of smart contracts.

In an exemplary embodiment, the entity may execute a networked process (e.g., a user account application) which may include in its dependencies a third party backend server (e.g., a server that may host the user account data). Through monitoring execution of the process, the system may determine that the process is experiencing latency (e.g., lack of responsiveness), and that the third party server is the root cause of the latency. Further, based on historical data, the system may determine that the third party server has failed to meet the performance standards. Based on executing the smart contract, the system may adjust a performance score or reliability score associated with the third party server (e.g., reduce the reliability score). Based on the performance score, the system may modify a workflow of the process by deciding whether to remove the third party server from the workflow and replace it with another component (e.g., a server hosted by a different third party). By scoring the various components involved in the process, the scores may then be used to selectively modify the architecture of the system to select the most reliable components to drive its processes.

The system as described herein provides a number of technological benefits over conventional systems for process management. In particular, by using a quantum AI based oracle, the system may intelligently identify when certain third party components have not been performing according to the requirements of the entity's networked system (e.g., the DLT network). In turn, this allows the entity to select the most reliable and high performance third party components to execute its various processes.

Figure 1A:
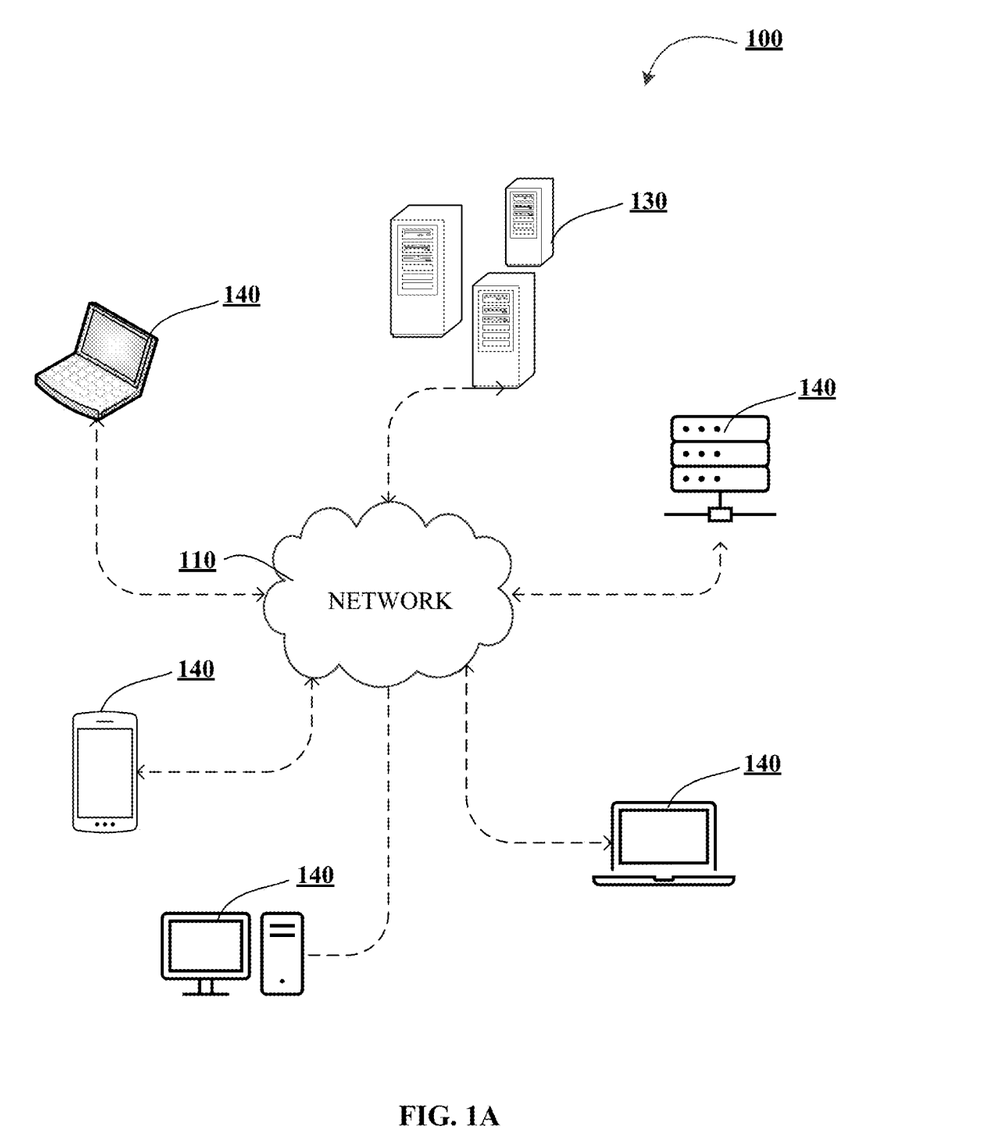
FIGS. 1A-1C illustrates technical components of an exemplary distributed computing environment for process monitoring using a quantum artificial intelligence powered distributed server network, in accordance with an embodiment of the disclosure.
Figure 1B:
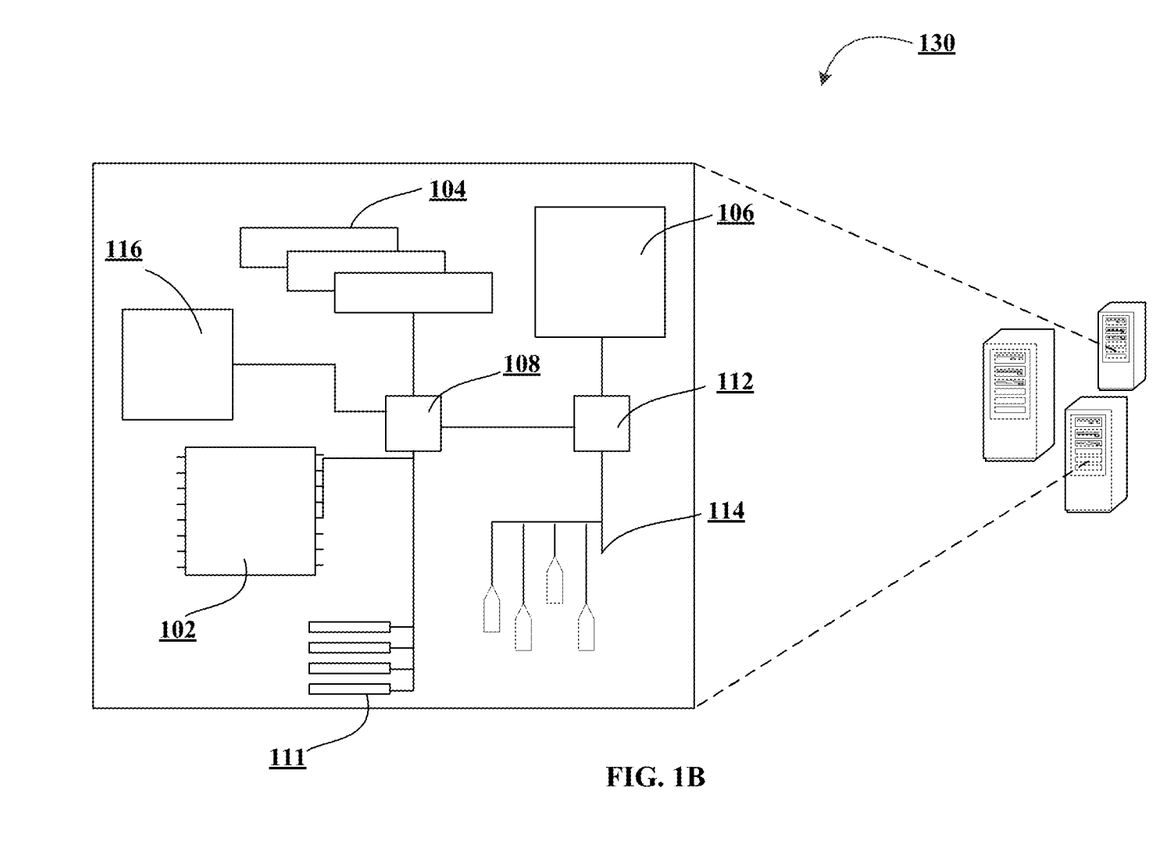
Figure 1C:
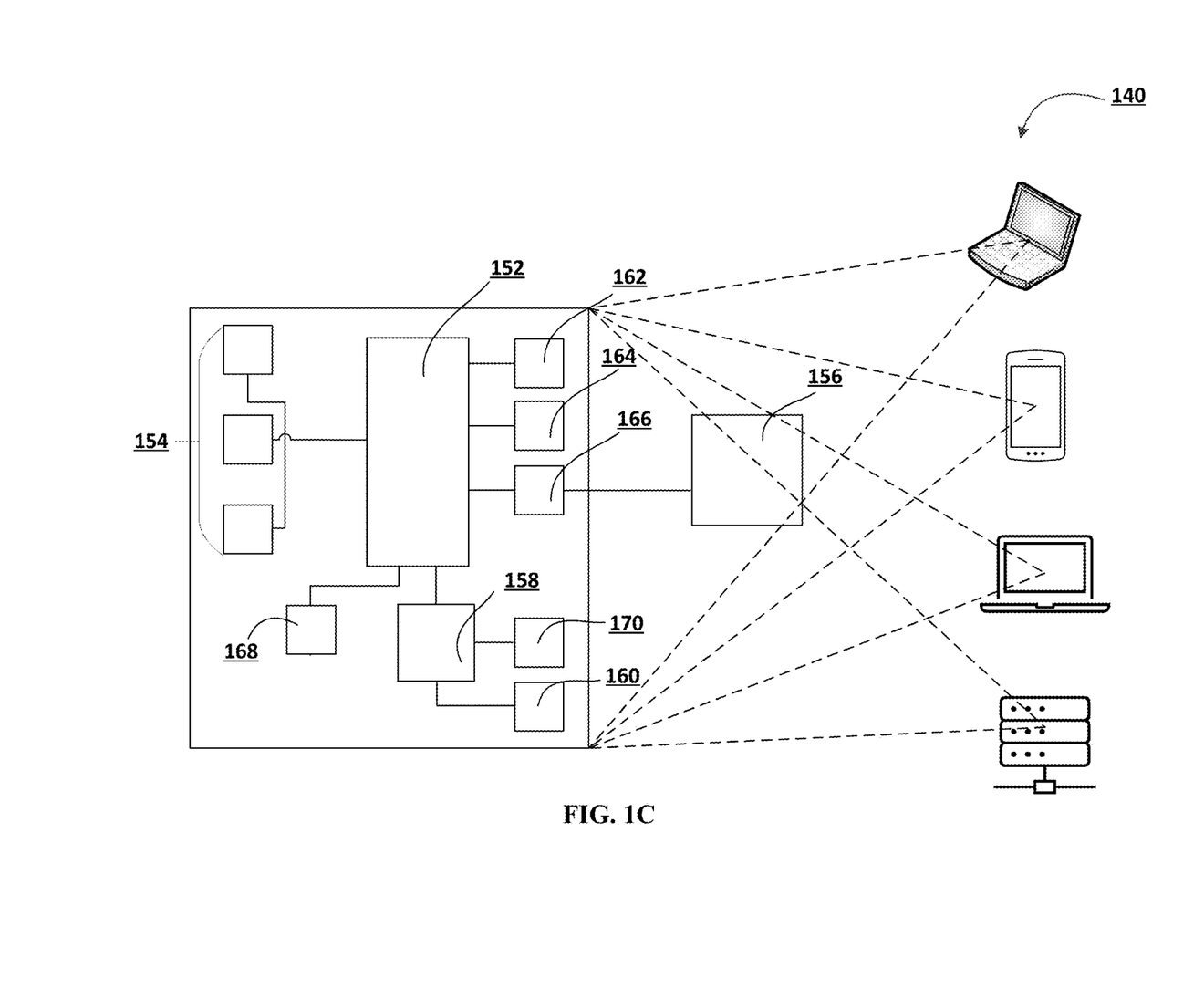

FIGS. 1A-1C illustrate technical components of an exemplary distributed computing environment 100 for the system for process monitoring using a quantum artificial intelligence powered distributed server network, in accordance with one embodiment of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2A:
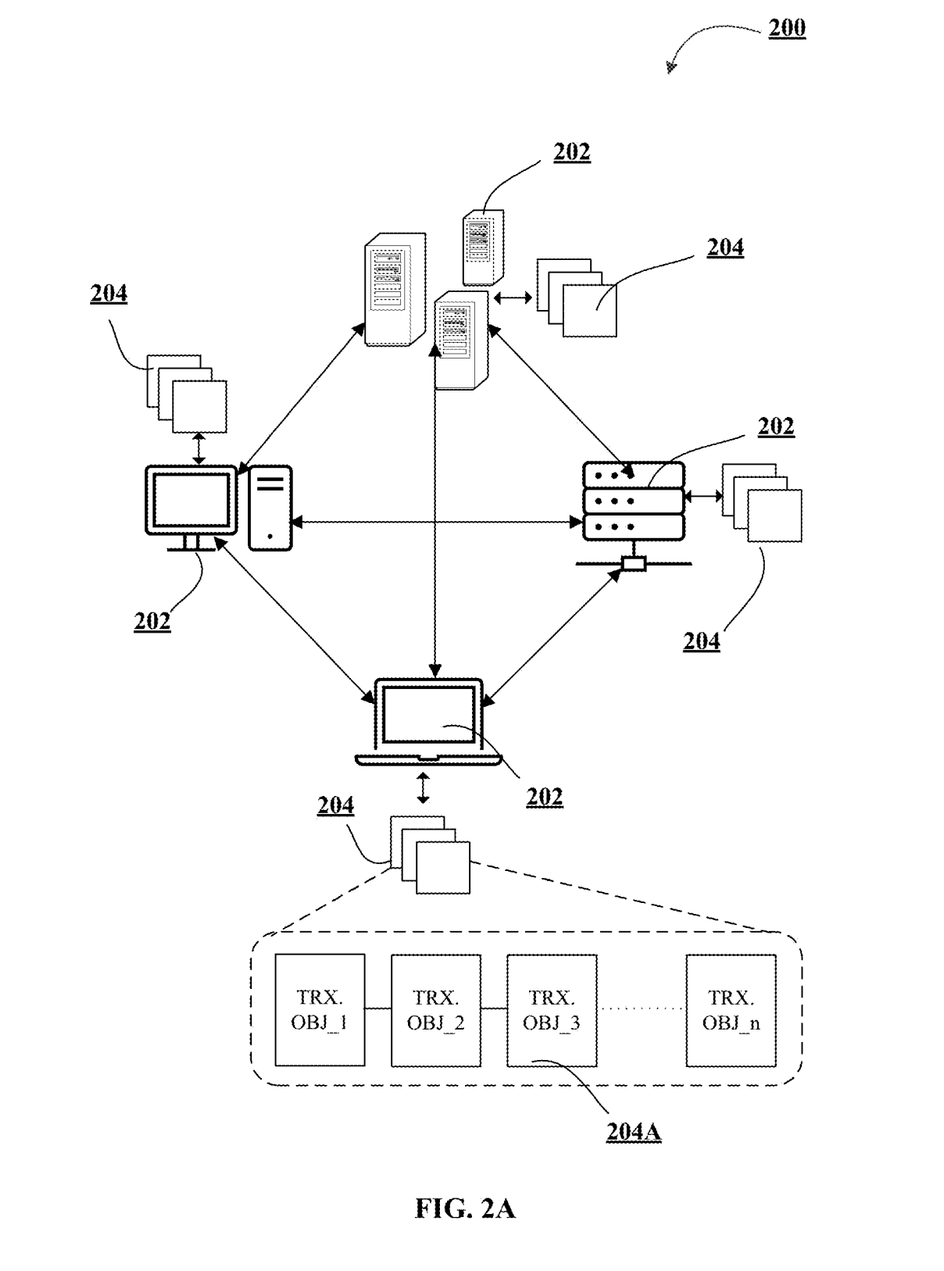
FIG. 2A illustrates an exemplary DLT architecture, in accordance with an embodiment of the disclosure.
Figure 2B:
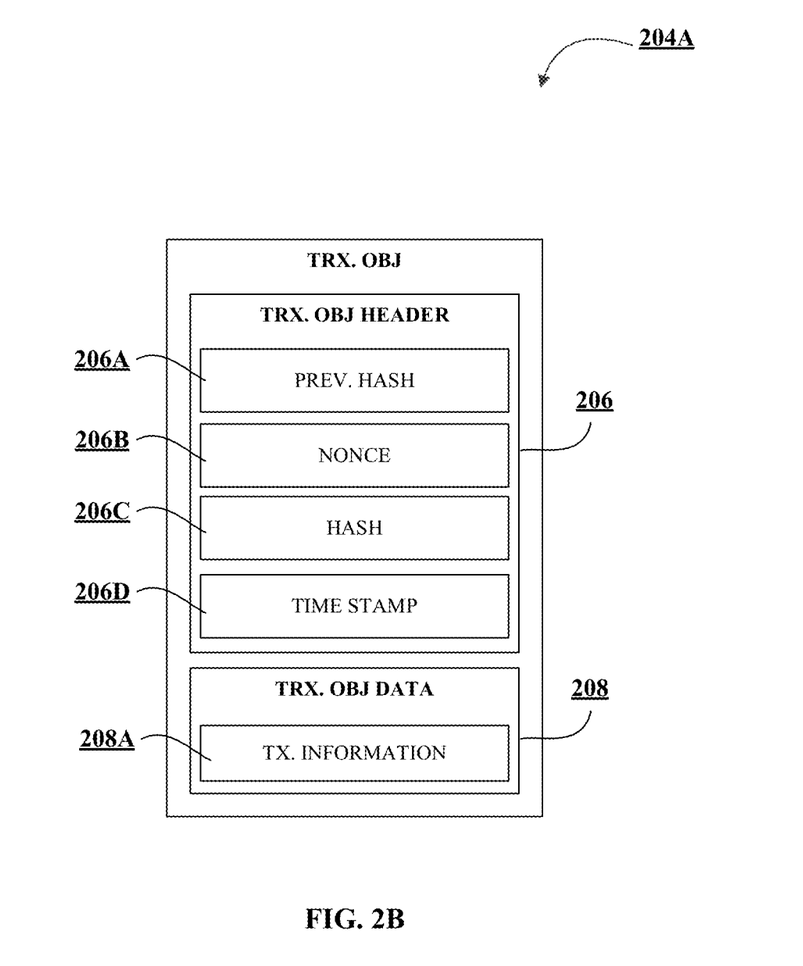
FIG. 2B illustrates an exemplary transaction object within the DLT architecture, in accordance with an embodiment of the disclosure.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT may use a peer-to-peer protocol for a cryptographically secured distributed ledger of transactions represented as transaction objects (which may also be referred to herein as "data records") that are linked. In some embodiments, the transaction objects or data records may contain state information about a resource that is tracked by the system. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT may use smart contracts. "Smart contracts" as used herein may refer to computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A "public distributed ledger" as referred to herein may refer to a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, a fully private distributed ledger may be a distributed ledger whereby permissions are kept centralized with one entity. The permissions may be public or restricted to an arbitrary extent. And lastly, a consortium distributed ledger may be a distributed ledger where the consensus process is controlled by a pre-selected set of nodes; for example, a distributed ledger may be associated with a number of member institutions (e.g., 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes. The transaction objects 204A may comprise an origin transaction object that may serve as the beginning of a chain of transaction objects, such that transaction objects 204A are added to the end of the chain beginning from the origin transaction object. In some embodiments, a subchain may be formed from any of the transaction objects 204A within the distributed ledger 204, where the subchain may comprise information relating to a specific resource tracked by the system.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

Figure 3:
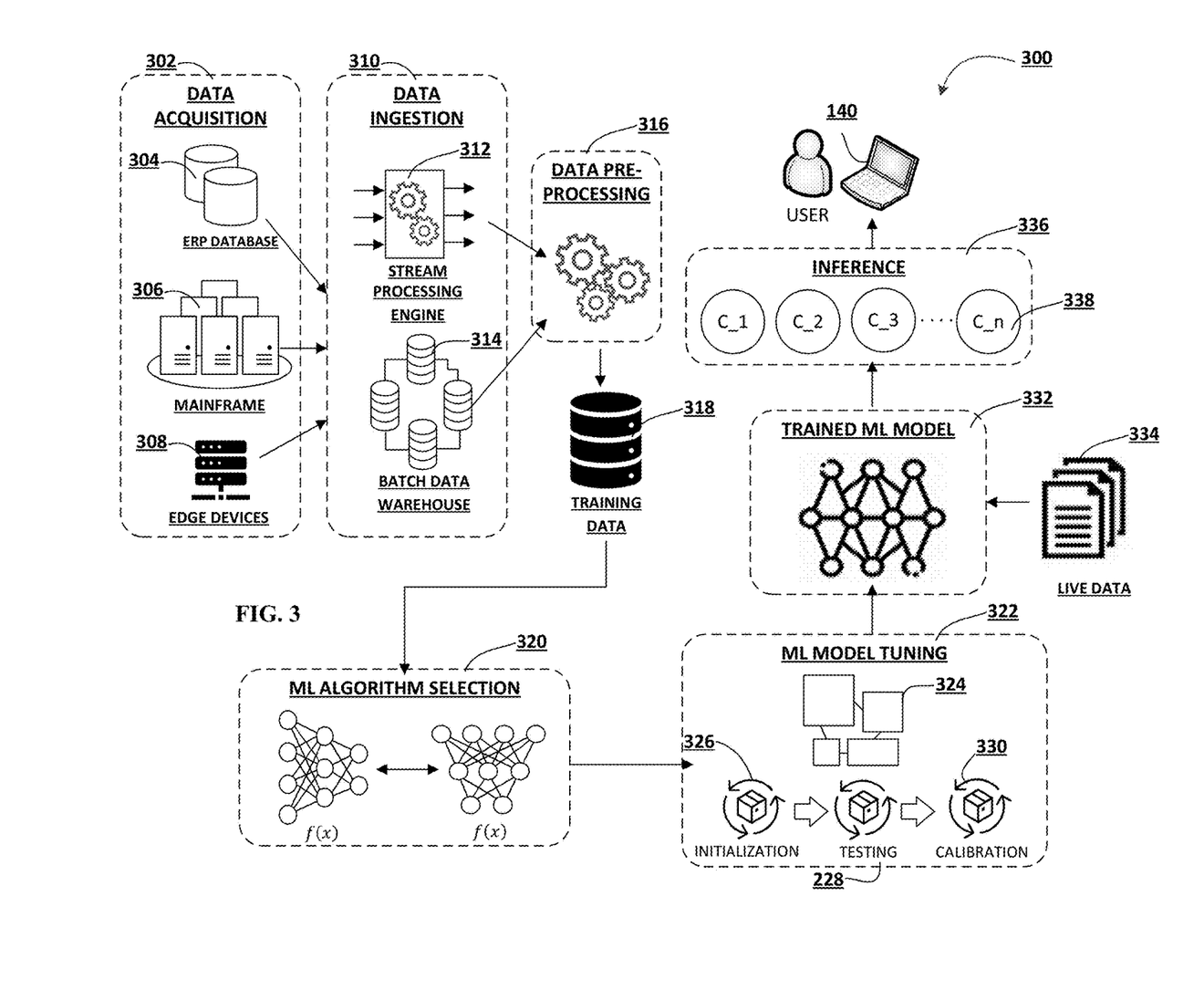
FIG. 3 illustrates an exemplary machine learning subsystem architecture, in accordance with an embodiment of the invention.

FIG. 3 illustrates an exemplary machine learning (ML) subsystem architecture 300, in accordance with an embodiment of the invention. The machine learning subsystem 300 may include a data acquisition engine 302, data ingestion engine 310, data pre-processing engine 316, ML model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ . . . . $C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ . . . . $C\_n$ 338) live data 334 based on how similar they are to one another to solve exploratory challenges where little is known about the data, provide a description or label (e.g., $C\_1$, $C\_2$ . . . . $C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

Figure 4:
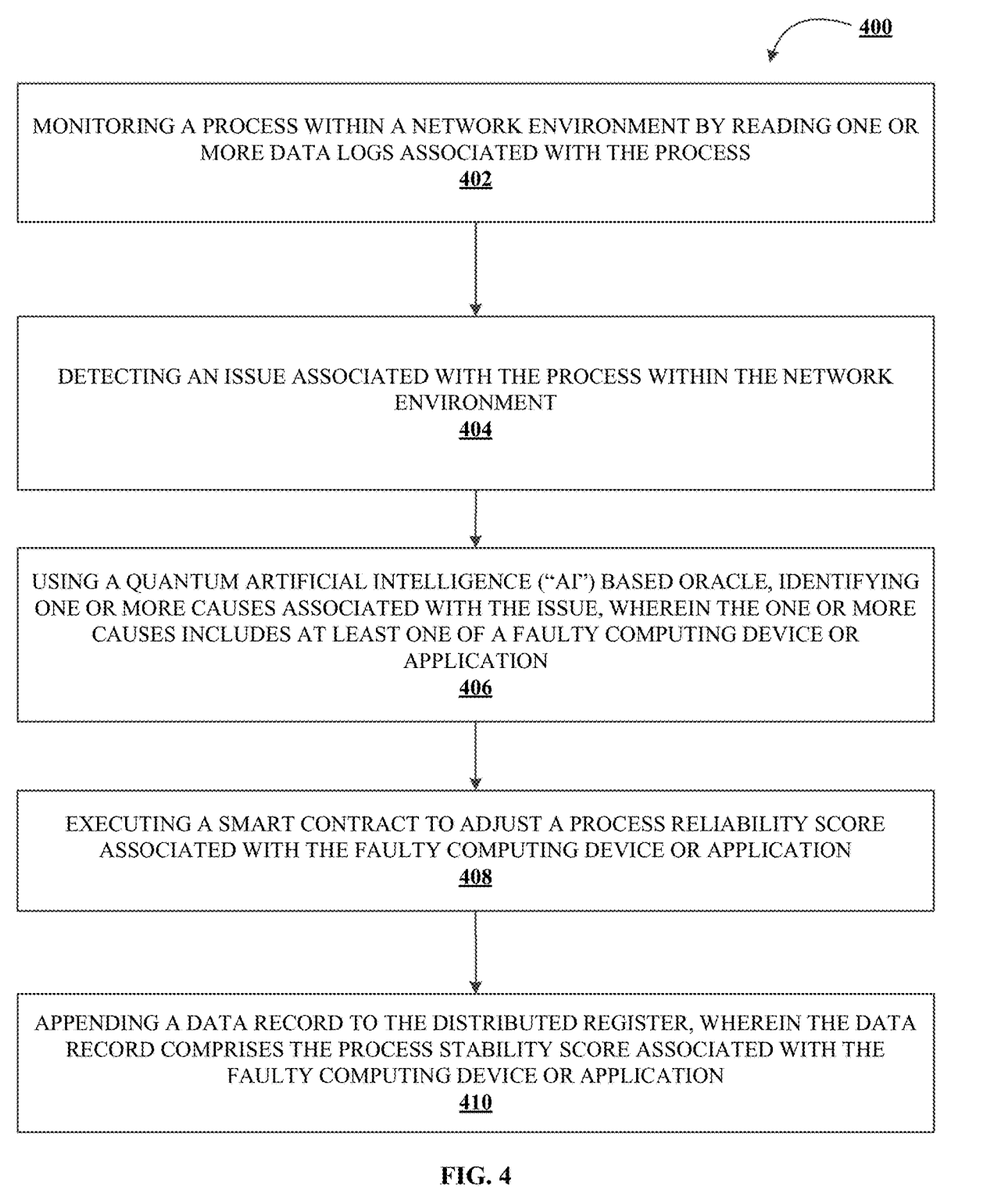
FIG. 4 illustrates a method for process monitoring using a quantum artificial intelligence powered distributed server network, in accordance with an embodiment of the disclosure.

FIG. 4 illustrates a method 400 for process monitoring using a quantum artificial intelligence powered distributed server network, in accordance with an embodiment of the disclosure. As shown in block 402, the method includes monitoring a process within a network environment by reading one or more data logs associated with the process. The data logs may contain various types of information regarding the process, such as a process name and/or description, process dependencies, both internal and third party components (e.g., backend servers, applications, DLT nodes, and/or the like) involved in the process, completed steps in the process, process exceptions and/or errors, and/or the like. By reading the logs generated and/or stored on the various computing devices that are part of the process, the system may monitor the execution of the process as well as which components associated with the process are functioning and which are not functioning at every given point in time.

Next, as shown in block 404, the method includes detecting an issue associated with the process within the network environment. The issue may be detected in some cases by the system reading the data logs associated with the process. For instance, the issue may be an issue with a third party component associated with the process, such as a computing device or application. In this regard, the issue may be a performance issue (e.g., a latency or responsiveness issue), a reliability issue (e.g., unavailability or unreachability of the component), functionality issue (e.g., a feature or function of the component is not working as intended), and/or the like.

Next, as shown in block 406, the method includes using a quantum artificial intelligence ("AI") based oracle, identifying one or more causes associated with the issue, wherein the one or more causes include at least one of a faulty computing device or application. The predictor module of the quantum AI based oracle may monitor a remediation of the issue by a third party associated with the faulty computing device or application. In this regard, the quantum AI oracle may monitor a time elapsed before remediation of the issue. Based on the time elapsed before remediation of the issue and other factors (e.g., a priority level associated with the issue, previous remediation steps executed with respect to the issue, historical records of issues associated with the faulty computing device or application, and/or the like), the predictor module may generate a recommendation to adjust the process stability score associated with the faulty computing device or application, as will be described in further detail below.

Next, as shown in block 408, the method includes executing a smart contract to adjust a process stability score associated with the faulty computing device or application. The process stability score (which may also be referred to herein as a "reliability score" or "performance score") may indicate the reliability and/or performance of a particular computing device or application involved in the workflow of the process. In some embodiments, adjusting the process stability score comprises, based on a timeframe specified in the smart contract, detecting a latency in resolving the issue, and subsequently reducing the process stability score. On the other hand, in some embodiments, adjusting the process stability score may comprise, detecting that the issue has been resolved according to a timeframe specified in the smart contract, and subsequently increasing the process stability score.

Next, as shown in block 410, the method includes appending a data record to the distributed register, wherein the data record comprises the process stability score associated with the faulty computing device or application. The distributed register may serve as a repository of process stability scores according to the adjustments to the process stability scores as determined by the system over time. Accordingly, the system may perform real-time adjustments of components of the workflow of the process based on the information contained within the distributed register. For example, the system may determine that a process stability score associated with the faulty computing device or application has fallen below a designated threshold. Based on determining that the process stability score has dropped below the threshold, the system may automatically remove the faulty computing device or application from the workflow of the process and include a substitute computing device or application into the workflow in place of the faulty computing device or application. On the other hand, the system may determine that the process stability score is still above the designated threshold. In such a scenario, the system may maintain the faulty computing device or application within the workflow of the process. In this way, the system may perform in-line real time selection of components to drive its processes.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for process monitoring using a quantum artificial intelligence powered distributed server network, the system comprising:
   a processing device;
   a non-transitory storage device containing instructions when executed by the processing device, causes the processing device to perform the steps of:
   monitoring a process within a network environment by reading one or more data logs associated with the process;
   detecting an issue associated with the process within the network environment;
   using a quantum artificial intelligence ("AI") based oracle, identifying one or more causes associated with the issue, wherein the one or more causes include at least one of a faulty computing device or application;
   executing a smart contract to adjust a process stability score associated with the faulty computing device or application; and
   appending a data record to the distributed register, wherein the data record comprises the process stability score associated with the faulty computing device or application.

2. The system of claim 1, wherein adjusting the process stability score comprises:
   based on a timeframe specified in the smart contract, detecting a delay in a resolution of the issue; and
   based on detecting the delay, decreasing the process stability score.

3. The system of claim 1, wherein adjusting the process stability score comprises:
   detecting a resolution of the issue within a timeframe specified in the smart contract; and
   increasing the process stability score.

4. The system of claim 2, wherein adjusting the process stability score further comprises:
   detecting that the process stability score has dropped below a designated threshold;
   removing the faulty computing device or application from a workflow of the process; and
   including a replacement computing device or application in the workflow of the process in place of the faulty computing device or application.

5. The system of claim 3, wherein adjusting the process stability score further comprises:

detecting that the process stability score is above a designated threshold; and maintaining the faulty computing device or application within a workflow of the process.

6. The system of claim 1, wherein the issue comprises at least one of a performance issue, stability issue, or functionality issue.

7. The system of claim 1, wherein the faulty computing device or application is a third party computing device or application.

8. A computer program product for process monitoring using a quantum artificial intelligence powered distributed server network, the computer program product comprising a non-transitory computer-readable medium comprising code causing an apparatus to perform the steps of:

monitoring a process within a network environment by reading one or more data logs associated with the process;

detecting an issue associated with the process within the network environment;

using a quantum artificial intelligence ("AI") based oracle, identifying one or more causes associated with the issue, wherein the one or more causes include at least one of a faulty computing device or application;

executing a smart contract to adjust a process stability score associated with the faulty computing device or application; and appending a data record to the distributed register, wherein the data record comprises the process stability score associated with the faulty computing device or application.

9. The computer program product of claim 8, wherein adjusting the process stability score comprises:

based on a timeframe specified in the smart contract, detecting a delay in a resolution of the issue; and based on detecting the delay, decreasing the process stability score.

10. The computer program product of claim 8, wherein adjusting the process stability score comprises:

detecting a resolution of the issue within a timeframe specified in the smart contract; and increasing the process stability score.

11. The computer program product of claim 9, wherein adjusting the process stability score further comprises:

detecting that the process stability score has dropped below a designated threshold;

removing the faulty computing device or application from a workflow of the process; and including a replacement computing device or application in the workflow of the process in place of the faulty computing device or application.

12. The computer program product of claim 10, wherein adjusting the process stability score further comprises:

detecting that the process stability score is above a designated threshold; and maintaining the faulty computing device or application within a workflow of the process.

13. The computer program product of claim 8, wherein the issue comprises at least one of a performance issue, stability issue, or functionality issue.

14. A computer-implemented method for process monitoring using a quantum artificial intelligence powered distributed server network, the computer-implemented method comprising:

monitoring a process within a network environment by reading one or more data logs associated with the process;

detecting an issue associated with the process within the network environment;

using a quantum artificial intelligence ("AI") based oracle, identifying one or more causes associated with the issue, wherein the one or more causes include at least one of a faulty computing device or application;

executing a smart contract to adjust a process stability score associated with the faulty computing device or application; and appending a data record to the distributed register, wherein the data record comprises the process stability score associated with the faulty computing device or application.

15. The computer-implemented method of claim 14, wherein adjusting the process stability score comprises:

based on a timeframe specified in the smart contract, detecting a delay in a resolution of the issue; and based on detecting the delay, decreasing the process stability score.

16. The computer-implemented method of claim 14, wherein adjusting the process stability score comprises:

detecting a resolution of the issue within a timeframe specified in the smart contract; and increasing the process stability score.

17. The computer-implemented method of claim 15, wherein adjusting the process stability score further comprises:

detecting that the process stability score has dropped below a designated threshold;

removing the faulty computing device or application from a workflow of the process; and including a replacement computing device or application in the workflow of the process in place of the faulty computing device or application.

18. The computer-implemented method of claim 16, wherein adjusting the process stability score further comprises:

detecting that the process stability score is above a designated threshold; and maintaining the faulty computing device or application within a workflow of the process.

19. The computer-implemented method of claim 14, wherein the issue comprises at least one of a performance issue, stability issue, or functionality issue.

20. The computer-implemented method of claim 14, wherein the faulty computing device or application is a third party computing device or application.

* * * * *